(12) United States Patent
Klein

(10) Patent No.: US 9,223,834 B2
(45) Date of Patent: Dec. 29, 2015

(54) DISTRIBUTED MULTI-SYSTEM MANAGEMENT

(71) Applicant: INTERNATIONAL BUSINESS MACHINES CORPORATION, Armonk, NY (US)

(72) Inventor: Arnon H. Klein, Ganey Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/444,297

(22) Filed: Jul. 28, 2014

(65) Prior Publication Data

US 2014/0337379 A1 Nov. 13, 2014

Related U.S. Application Data

(63) Continuation of application No. 13/532,938, filed on Jun. 26, 2012, now Pat. No. 8,793,710, which is a continuation of application No. 13/015,003, filed on Jan. 27, 2011, now Pat. No. 8,789,072.

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 17/30 | (2006.01) |
| G06F 11/30 | (2006.01) |
| H04L 12/24 | (2006.01) |
| H04L 29/08 | (2006.01) |
| G06F 9/48 | (2006.01) |
| H04L 12/26 | (2006.01) |

(52) U.S. Cl.
CPC ........ *G06F 17/30545* (2013.01); *G06F 9/4806* (2013.01); *G06F 11/3006* (2013.01); *G06F 11/3055* (2013.01); *H04L 41/0893* (2013.01); *H04L 43/08* (2013.01); *H04L 67/1097* (2013.01); *H04L 43/0817* (2013.01); *H04L 67/1002* (2013.01)

(58) Field of Classification Search
CPC .................................................. G06F 17/30545
USPC ......................................................... 719/330
See application file for complete search history.

(56) References Cited

U.S. PATENT DOCUMENTS

| | | | |
|---|---|---|---|
| 7,747,674 | B2 | 6/2010 | Barkai et al. |
| 7,761,485 | B2 | 7/2010 | Papoutsakis et al. |
| 2005/0102328 | A1 | 5/2005 | Ring et al. |
| 2009/0028163 | A1 | 1/2009 | Blathereick et al. |
| 2010/0198888 | A1 | 8/2010 | Blomstedt et al. |
| 2012/0166390 | A1 | 6/2012 | Merriman et al. |

*Primary Examiner* — Timothy A Mudrick
(74) *Attorney, Agent, or Firm* — Griffiths & Seaton PLLC

(57) ABSTRACT

Methods, systems and computer program products for operating a plurality of nodes within a network are provided. Using a monitoring node, a subgroup of the plurality of nodes is monitored, the subgroup including the monitoring node and a non-monitoring node. The non-monitoring node is configured to not manage a distributed database distributed among all monitoring nodes of the plurality of nodes, other non-monitoring nodes of the plurality of nodes, and the monitoring nodes of the plurality of nodes and is configured to not store replicated data from other ones of the plurality of nodes. Information from the subgroup is exchanged with a monitoring node of another subgroup of the plurality of nodes over the network, using the monitoring node.

20 Claims, 2 Drawing Sheets

DISTRIBUTED MULTI-SYSTEM MANAGEMENT

CROSS-REFERENCE TO RELATED APPLICATIONS

This application is a Continuation of U.S. patent application Ser. No. 13/532,938, filed on Jun. 26, 2012, which is a Continuation of U.S. patent application Ser. No. 13/015,003, filed on Jan. 27, 2011.

FIELD OF THE INVENTION

The present invention relates generally to computer system management, and specifically to managing multiple networked digital information devices.

BACKGROUND OF THE INVENTION

Contemporary digital information devices, also referred to herein as computers, can be monitored and configured (i.e., managed) by a management server coupled to the devices via a network. The management server can be configured to perform simple functions, such as forwarding a system administrator's commands to a specific device on the network. Additionally, the management server can be configured to perform advanced functions, such as querying all the devices and maintaining a database storing states of all the managed devices.

SUMMARY OF THE INVENTION

There is provided, in accordance with an embodiment of the present invention a method, including arranging multiple digital information devices having respective memories to communicate within a network, assigning within each of a subset of the respective memories a respective memory region dedicated only to management of a respective subgroup of the multiple devices, the subset and the subgroup each having a cardinality of at least two, and managing the multiple digital information devices by exchanging information stored in the respective memory regions among the digital information devices over the network.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
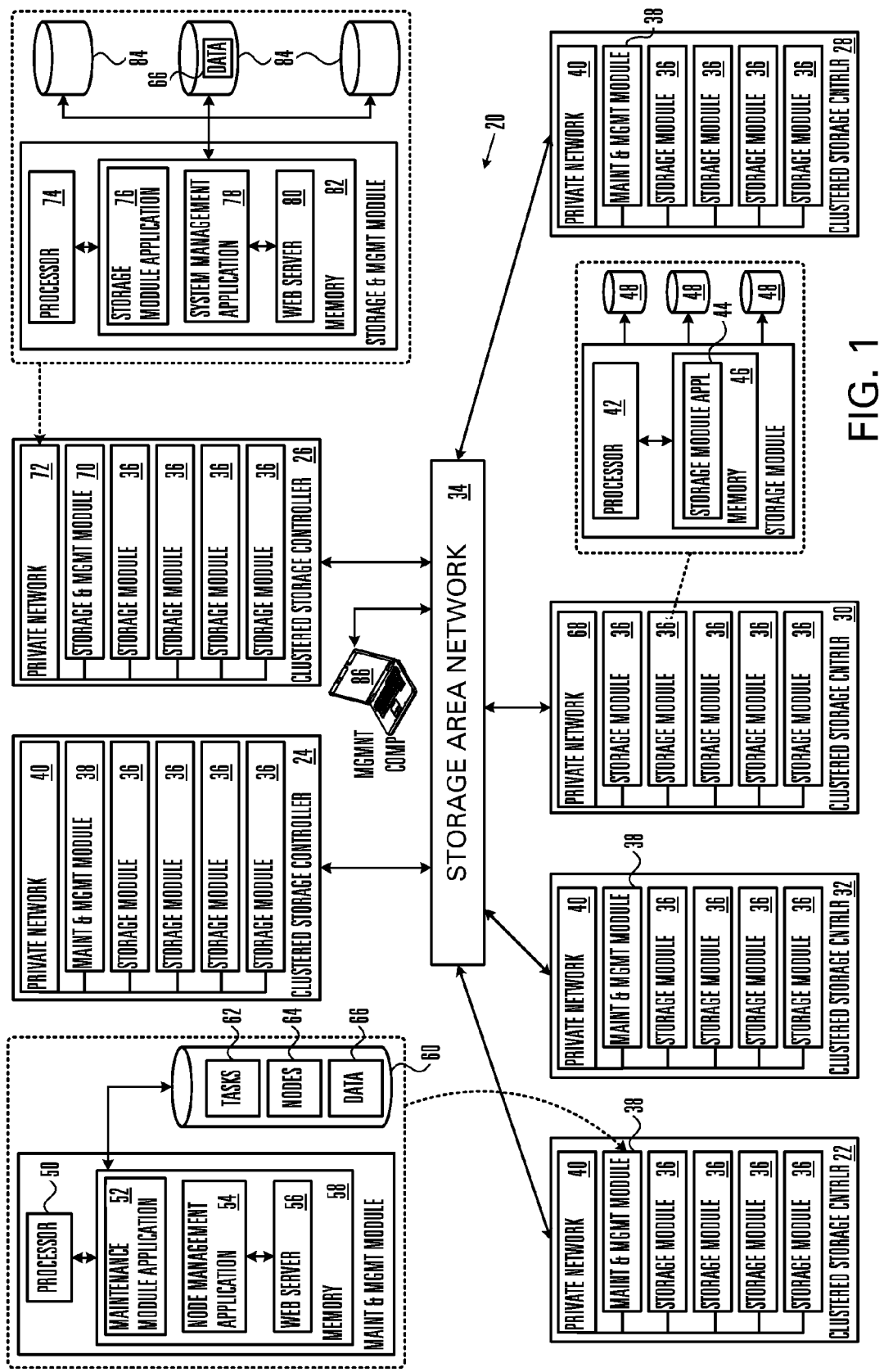
FIG. 1 is a schematic pictorial illustration of a system that employs a multi-system management distributed database, in accordance with an embodiment of the present invention.

When managing a network of multiple digital information devices such as clustered storage controller nodes, it sometimes may be desirable for a system administrator to manage the nodes by accessing and monitoring the states of all the nodes. Embodiments of the present invention provide methods and systems for managing the multiple nodes using a distributed database whose implementation is spread among the nodes themselves.

When digital information devices communicate over a network, they may execute remote procedure calls (RPC) via the network. A RPC is an inter-process communication that enables a software application to cause a subroutine or procedure to execute in another address space (commonly on another digital information device on the network). In operation, an RPC client conveys a RPC to a RPC server, which executes the called procedure referenced by the RPC. After executing the called procedure, the RPC server may convey a result back to the RPC client. For example, if the RPC comprises a database query, the RPC server conveys a query result back to the RPC client.

In some embodiments, multiple nodes having respective memories are arranged to communicate within a network and to execute node management applications. The node management applications execute from a subset of the respective memories dedicated to managing the networked nodes. To administer the distributed database, each instance of the node management applications manages a respective subgroup of the multiple nodes, and exchanges information about the managed subgroup with the other node management applications via the network. The subset of the respective memories and the subgroup of the managed digital information devices typically have a cardinality of at least two.

The node management applications can be executed by lightly used processors in each of the nodes (e.g., a processor in a maintenance module described hereinbelow). If there is no lightly used processor in a particular node, then any processor in the node can execute the node management application.

Each node executing one of the node management applications may be assigned monitoring "tasks" which specify a node to be monitored, and any monitoring parameters comprising specific information to be retrieved (e.g., device utilization). Upon being assigned the task, the node can retrieve the information from the specified node, and store the information to the distributed database.

Not all nodes on the network may be required to execute the node management application. For example, there may be nodes on the network that do not have the capability (e.g., due to processor and/or memory limitations) to execute the node management application. While nodes not executing the node manager application, i.e., non-monitoring nodes, do not participate in managing the distributed database, other nodes on the network executing the node management applications, i.e., monitoring nodes, can still monitor the non-monitoring nodes. The monitoring and the non-monitoring nodes are typically complementary subgroups of all the nodes on the network.

Additionally, some or all of the monitoring nodes may execute a web server application that can be configured to interact with the distributed database. The web server application can process and respond to queries about the state of the nodes by either retrieving the information from the distributed database, or querying and retrieving the information directly from the nodes themselves. While the embodiments discussed herein describe the monitoring nodes executing web server applications that interact with the distributed database, the monitoring nodes may execute another type of remote procedure call (RPC) server application configured to interact and process queries for the distributed database.

Embodiments of the present invention enable a system management distributed database to efficiently scale as more nodes are added to the network. In other words, as nodes are added to the network, the additional nodes provide extra processing and storage capacity to manage the growing number of nodes.

Furthermore, implementing the distributed database with replicated data distributed among the nodes can eliminate a single point of failure, since distributed database information stored on a failed node is typically replicated on at least one additional node. Therefore, the distributed database can continue to function even in the event of multiple software or hardware failures (up to a certain fraction of the nodes, depending on the configuration of the distributed database).

System Description

FIG. 1 is a schematic pictorial illustration of a system 20 that employs a multi-system management distributed database, in accordance with an embodiment of the present invention. System 20 comprises clustered storage controllers 22, 24, 26, 28, 30 and 32 coupled to a storage area network (SAN) 34. In the configuration shown in FIG. 1, clustered storage controllers 22, 24, 26, 28 and 32 are monitoring nodes, and clustered storage controller 30 is a non-monitoring node. As discussed supra, the monitoring nodes participate in managing system 20, including any non-monitoring nodes.

Each clustered storage controller 22, 24, 28 and 32 comprises multiple storage modules 36, and a maintenance and management module 38 that participates in managing system 20, as described hereinbelow. Within each one of these controllers, modules 36 and module 38 are coupled via a respective private network 40 that enables modules 36 and 38 to communicate with one another.

Each storage module 36 comprises a storage module processor 42 that executes a storage module application 44 from a memory 46. The storage module applications are configured to process input/output (I/O) requests, transfer data from/to a number of storage devices 48, and convey the result of the I/O requests (e.g., an acknowledgement of a write operation, or the retrieved data of a read operation) to host computers (not shown) on SAN 34. Storage devices 48 typically comprise a combination of high capacity hard disk drives and solid-state disk drives.

While the description herein relates generally to a network of clustered storage controllers, it will be understood that embodiments of the present invention may also be used for a system of networked digital information devices of other types, and those having ordinary skill in the art will be able to adapt the description, mutatis mutandis, to apply to a system of networked digital information devices. Examples of digital information devices that can be managed using embodiments of the present invention include routers, network switches, printers, and other devices comprising a processor, a memory and a network interface.

Each maintenance and management module 38 comprises a maintenance module processor 50 that executes a maintenance application 52, a node management application 54 and a web server application 56 from a memory 58 coupled to the maintenance module processor. Each module 38 also comprises a local storage device 60 configured to store a task list 62, a node list 64 and state data 66. State data 66 comprises stores state information for the clustered storage controllers in system 20. Examples of state information include volume lists, usage statistics, malfunctioning device identifications, device capacity and device utilization.

The distributed database, comprising management metadata and state data 66, is typically distributed among the storage devices in system 20. In the configuration shown in FIG. 1, the management metadata comprises task list 62 and node list 64. Additionally or alternatively, the distributed database may be stored in memory 58 or another type of digital storage device coupled to system 20, for example, a flash memory storage device (not shown).

Task list 62 stores tasks for updating the distributed database, and node list 64 stores a list of the nodes currently active in system 20. Task list 62 and node list 64 are discussed in further detail hereinbelow.

The maintenance module applications typically perform intermittent (i.e., on an as-needed basis) operations such as diagnosing storage modules 36 and updating storage module applications 44. Therefore, maintenance module processor 50 is typically lightly utilized, and does not need to be as powerful as storage module processor 42. Since the management of the distributed database is divided among the monitoring nodes, embodiments of the present invention enable less powerful processors (i.e., in relation to the processor 42) such as processor 50, to execute the node management applications to manage the distributed database.

The node management applications are configured to manage the distributed database, and the web server applications are configured to process and convey information in response to a query of the distributed database. The node management applications and the web server applications are discussed in further detail hereinbelow.

Clustered storage controller 30 comprises multiple storage modules 36 coupled via a private network 68. In the configuration shown in FIG. 1, controller 30 is a non-monitoring node. In other words, while controller 30 does not participate in the distributed management of system 20, the monitoring nodes of system 20 manage all the nodes (i.e., the clustered storage controllers) of system 20, including controller 30.

Clustered storage controller 26 comprises multiple storage modules 36, and a storage and management module 70 that participates in managing system 20, as described hereinbelow. Within controller 26, modules 36 and module 70 are coupled via a private network 72 that enables modules 36 and 70 to communicate with one another.

While storage and management module 70 may comprise the same hardware configuration as storage module 36, module 70 comprises a storage processor 74 that executes a storage module application 76, a node management application 78 and a web server application 80 from a memory 82 coupled to storage processor 74. Applications 76, 78, and 80 are substantially similar in functionality to applications 44, 54 and 56, respectively. In addition to storing data for storage module application 76, storage devices 84 also store the distributed database.

In the configuration shown in FIG. 1, processor 74 executes applications 76, 78 and separate processes from memory 82, and processor 50 executes applications 52, 54 and 56 as separate processes from memory 58. In some embodiments, processors 50 and 74 may execute the node management applications and the web server applications via a virtualization engine, or a virtual machine. Utilizing virtualization (also called sandboxing) can segregate the node management applications and the web server application from other processes executing on the respective processors.

As discussed supra, controllers 22, 24, 26, 28 and 32 are monitoring nodes that manage the distributed database. The monitoring nodes execute the node management applications from respective memory regions, where each of the respective memory regions is dedicated to managing a subgroup of the storage controllers in system 20. Typically, the distributed database is distributed (and replicated) among all the monitoring nodes. While controller 30 is a non-monitoring node that typically does not participate in managing the distributed database, a subset of the memories of the clustered storage controllers (i.e., the monitoring nodes) execute the node management applications that manage all the nodes of system 20, including controller 30.

In some embodiments, the node management applications perform tasks retrieved from task list 62 in order to update the distributed database. For example, a task may comprise a node identity and a specified time of day. Examples of task list entries are shown in the following table:

| NODE IDENTITY | TIME OF DAY |
|---|---|
| NODE 22 | 16:05 |
| NODE 24 | 16:10 |
| NODE 26 | 16:15 |

To update the distributed database, each of the node management applications first retrieves a task from task list 62. At the specified times, the node management applications query the appropriate nodes, update the distributed database with the status of the nodes, and retrieve new tasks from task list 62. A failure of one of the nodes typically has minimal impact on the distributed database. Even if one or more of the nodes fail, the remaining nodes can still retrieve tasks from the task list, update the distributed database, and convey any alerts to a system administrator (e.g., a device failure, or a performance parameter exceeding a defined limit, such as when one of the storage devices is almost fully utilized).

In the configuration shown in FIG. 1, storage device 60 stores task list 62, node list 64 and distributed state data 66 on local storage device 60. In other embodiments, maintenance and management module 38 may store task list 62, node list 64 and state data 66 to storage devices 48, via private network 40. In further embodiments, task list 62, node list 64 and state data 66 may be stored to a remote storage device (not shown).

System 20 also comprises a management computer 86, which is coupled to SAN 34, and which can execute an administration application (not shown) configured to query the distributed database via web service queries. Using an administration application to query the distributed database is discussed hereinbelow. While the embodiments discussed herein describe management computer 86 executing an administration application configured to query the distributed database via web service queries, management computer 86 may execute another type of remote procedure call (RPC) client application configured to convey queries to the distributed database.

Processors 42, 50 and 74 typically comprise general-purpose computers configured to carry out the functions described herein. Software operated by the processors may be downloaded to a the memories in electronic form, over a network, for example, or it may be provided on non-transitory tangible media, such as optical, magnetic or electronic memory media. Alternatively, some or all of the functions of the processors may be carried out by dedicated or programmable digital hardware components, or by using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Distributed Database Management

Figure 2:
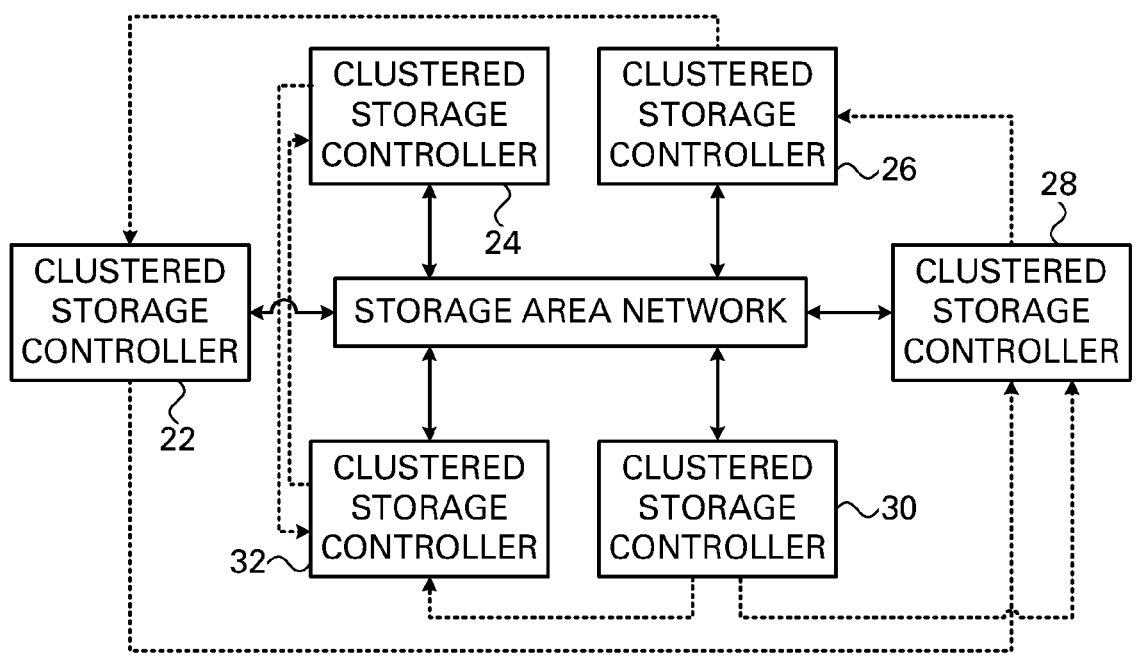
FIG. 2 is a schematic pictorial illustration showing replication of the multi-system management distributed database, in accordance with an embodiment of the present invention.

FIG. 2 is a schematic pictorial illustration showing replication of the multi-system management distributed database, in accordance with an embodiment of the present invention. To implement data replication, each of the monitoring nodes typically stores information for itself and at least one other node (the latter storage is shown in the diagram by arrows from the other node to the monitoring node). In the example configuration shown in FIG. 2, data stored in the distributed database is replicated as follows:

Controller 22 stores replicated data for controller 26.
Controller 24 stores replicated data for controller 32.
Controller 26 stores replicated data for controller 28.
Controller 28 stores replicated data for controllers 22 and 30. Since controller 30 is a non-monitoring node, all instances of the state data for controller 30 are stored on monitoring nodes.
Controller 32 stores replicated data for controllers 24 and 30.

In some embodiments, the distributed database comprises the following attributes:

The distributed database can increase in size when more nodes are added to system 20.
The distributed database typically replicates every item among several nodes (for load-balancing and fault-tolerance purposes).
Due to data replication, the distributed database typically does not have any single point of failure. If one of the storage devices storing distributed database shuts down or fails, the distributed database still has access to the replicated data.
The distributed database can automatically detect and heal itself, in the event a node shuts down or fails. If a node management application detects a non-operational (e.g., failed or shut down) node, the node management application can convey the non-operational node's status to management computer 86. Additionally, the node management application can also remove the detected node from node list 64 and task list 62, thereby ensuring that the distributed database continues to process updates and queries with minimal or no interruption.

Figure 3:
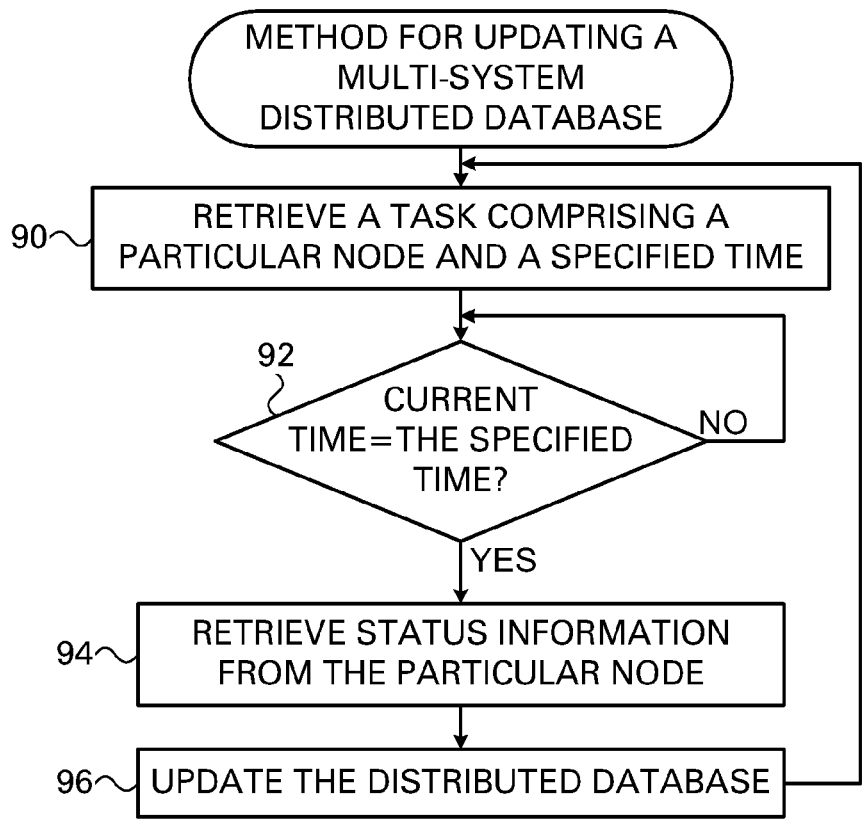
FIG. 3 is a flow diagram that schematically illustrates a method of updating the multi-system management distributed database, in accordance with an embodiment of the present invention.

FIG. 3 is a flow diagram that schematically illustrates a method of updating the multi-system management distributed database, in accordance with an embodiment of the present invention. The method described herein can be simultaneously performed by all instances of the node management applications executing in system 20. In a first step 90, the node management application retrieves a task from task list 62, the task comprising a particular node whose status is to be updated in the distributed database at a specified time. In a time compare step 92, the node management application waits until the current time matches the specified time. When the current time matches the specified time, the node management application queries the particular node (e.g., controller 28) and retrieves its state information in a query step 94. In a database update step 96, the node management application updates the distributed database, and the method continues with step 90.

As described supra, management computer 86 may execute an administration application, which can be used to query the nodes on system 20 via web service queries. The web server applications can respond to the queries about the state of the nodes by either retrieving the information from the distributed database, or retrieving the information directly from one of the nodes.

In order to balance the load on the web server applications, and to supply fault tolerance, the web server applications can convey node list 64 comprising a list of the nodes executing the web server applications to management computer 86. Using node list 64, management computer 86 can then directly contact any of the web server applications in system 20, and/or query the distributed database via the contacted web server application.

In some embodiments, system 20 implements a Uniform Resource Locator (URL) paradigm to enable the administration application executing on management computer 86 to query the distributed database via the web service queries. The queries submitted by the administration application executing on management computer 86 may be structured as follows:

http://NodeId/ModuleId/Parameter where NodeId specifies the clustered storage controller, ModuleId specifies the storage module, and Parameter specifies information to be retrieved. For example, the URL http://CSC24/03/volumes requests the states of the volumes on storage devices 48 of the third storage module 36 of clustered storage controller 24. Upon receiving the query, the appropriate web server application retrieves the requested information from the distributed database, and conveys the requested information to management computer 86 via SAN 34.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for operating a plurality of nodes within a network, the method comprising:
monitoring, using a monitoring node, a subgroup of the plurality of nodes, the subgroup including the monitoring node and a non-monitoring node, the non-monitoring node configured to not manage a distributed database distributed among all monitoring nodes of the plurality of nodes, other non-monitoring nodes of the plurality of nodes, and the monitoring nodes of the plurality of nodes and configured to not store replicated data from other ones of the plurality of nodes; and
exchanging information from the subgroup with a monitoring node of another subgroup of the plurality of nodes over the network, using the monitoring node.

2. The method of claim 1, further comprising:
retrieving information from the non-monitoring node and storing the information to the distributed database.

3. The method of claim 1, further comprising:
retrieving information from the distributed database, in response to a query requesting a state of one or more nodes in the subgroup of the plurality of nodes.

4. The method of claim 1, further comprising:
performing a task retrieved from a task list in order to update the distributed database.

5. The method of claim 1, wherein the step of performing the task retrieved from the task list includes:
querying a node corresponding to the task in the task list, and
updating the distributed database with a status of the corresponding node, and retrieving new tasks from the task list.

6. The method of claim 1, further comprising:
detecting a non-operational node in the subgroup, and
conveying a status of the non-operational node to a management computer.

7. The method of claim 6, further comprising removing the non-operational node from the task list.

8. A system for operating a network, the system comprising:
a plurality of nodes including at least one subgroup including a monitoring node and a non-monitoring node, the monitoring node including:
a processor device, and
a memory including instructions stored thereon which when executed by the processor device causes the monitoring node to:
monitor the subgroup of the plurality of nodes, the subgroup including the monitoring node and the non-monitoring node, the non-monitoring node configured to not manage a distributed database distributed among all monitoring nodes of the plurality of nodes, other non-monitoring nodes of the plurality of nodes, and the monitoring nodes of the plurality of nodes and configured to not store replicated data from other ones of the plurality of nodes; and
exchange information from the subgroup with a monitoring node of another subgroup of the plurality of nodes over the network.

9. The system of claim 8, wherein the memory further comprises instructions stored thereon which when executed by the processor device causes the monitoring node to:
retrieve information from the non-monitoring node and storing the information to the distributed database.

10. The system of claim 8, wherein the memory further comprises instructions stored thereon which when executed by the processor device causes the monitoring node to:
retrieve information from the distributed database, in response to a query requesting a state of one or more nodes in the subgroup of the plurality of nodes.

11. The system of claim 8, wherein the memory further comprises instructions stored thereon which when executed by the processor device causes the monitoring node to:
perform a task retrieved from a task list in order to update the distributed database.

12. The system of claim 8, wherein the memory further comprises instructions stored thereon which when executed by the processor device causes the monitoring node to, as part of performing the task retrieved from the task list:
query a node corresponding to the task in the task list, and
update the distributed database with a status of the corresponding node, and retrieve new tasks from the task list.

13. The system of claim 8, wherein the memory further comprises instructions stored thereon which when executed by the processor device causes the monitoring node to:
detect a non-operational node in the subgroup, and
convey a status of the non-operational node to a management computer.

14. A computer program product for operating a plurality of nodes within a network, the computer program product comprising a non-transitory computer-readable storage medium having computer-readable program code portions stored therein, the computer-readable program code portions comprising:
a first executable code portion for monitoring, using a monitoring node, a subgroup of the plurality of nodes, the subgroup including the monitoring node and a non-monitoring node, the non-monitoring node configured to not manage a distributed database distributed among all monitoring nodes of the plurality of nodes, other non-monitoring nodes of the plurality of nodes, and the monitoring nodes of the plurality of nodes and configured to not store replicated data from other ones of the plurality of nodes; and
a second executable code portion for exchanging information from the subgroup with a monitoring node of another subgroup of the plurality of nodes over the network, using the monitoring node.

15. The computer program product of claim 14, further comprising:
a third executable code portion for retrieving information from the non-monitoring node and storing the information to the distributed database.

16. The computer program product of claim 14, further comprising:
a third executable code portion for retrieving information from the distributed database, in response to a query requesting a state of one or more nodes in the subgroup of the plurality of nodes.

17. The computer program product of claim 14, further comprising:
   a third executable code portion for performing a task retrieved from a task list in order to update the distributed database.

18. The computer program product of claim 14, wherein the third executable code portion includes:
   executable code for querying a node corresponding to the task in the task list, and
   executable code for updating the distributed database with a status of the corresponding node, and retrieving new tasks from the task list.

19. The computer program product of claim 14, further comprising:
   a third executable code portion for detecting a non-operational node in the subgroup, and
   a fourth executable code portion for conveying a status of the non-operational node to a management computer.

20. The computer program product of claim 19, further comprising a fifth executable code portion for removing the non-operational node from the task list.

* * * * *